(12) United States Patent
Lee et al.

(10) Patent No.: US 9,029,016 B2
(45) Date of Patent: May 12, 2015

(54) NEGATIVE ACTIVE MATERIAL, METHOD OF PREPARING THE SAME, AND LITHIUM BATTERY INCLUDING THE SAME

(75) Inventors: So-Ra Lee, Yongin-si (KR); Chang-Su Shin, Yongin-si (KR); Ui-Song Do, Yongin-si (KR); Beom-Kwon Kim, Yongin-si (KR); Jae-Myung Kim, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 373 days.

(21) Appl. No.: 13/427,102

(22) Filed: Mar. 22, 2012

(65) Prior Publication Data

US 2012/0288766 A1  Nov. 15, 2012

(30) Foreign Application Priority Data

May 11, 2011  (KR) .................. 10-2011-0044074

(51) Int. Cl.
*H01M 4/583* (2010.01)
*H01M 4/38* (2006.01)
(Continued)

(52) U.S. Cl.
CPC .............. *H01M 4/587* (2013.01); *H01M 4/366* (2013.01); *H01M 4/38* (2013.01); *H01M 10/0525* (2013.01); *Y02E 60/122* (2013.01); *C01B 31/02* (2013.01); *Y10S 977/773* (2013.01)

(58) Field of Classification Search
CPC ......... H01M 4/583; H01M 4/38; H01M 4/04; H01M 4/364; H01M 4/133; H01M 4/136; B05D 3/02; B82Y 30/00

USPC ................. 429/223, 231.8; 427/113; 977/773
See application file for complete search history.

(56) References Cited

U.S. PATENT DOCUMENTS 6,485,864 B1  11/2002  Miyazawa et al.
2002/0076614 A1  6/2002  Yoon et al.
(Continued)

FOREIGN PATENT DOCUMENTS

CN  1697215 A  11/2005
CN  101456553 A  6/2009
(Continued)

OTHER PUBLICATIONS

Extended European Search Report dated Aug. 21, 2012 in examination of European Patent Application No. 12 165 048.5, 5 pages.
(Continued)

*Primary Examiner* — Karie O'Neill Apicella
(74) *Attorney, Agent, or Firm* — Knobbe Martens Olson & Bear LLP

(57) ABSTRACT

Provided are a negative active material, a method of preparing the same, and a lithium battery including the negative active material. The negative active material includes a carbonaceous core that has a sulfur content of about 10 ppm to 900 ppm; and an amorphous carbon layer continuously formed on a surface of the carbonaceous core, wherein the carbonaceous core has a crystalloid plate structure, and a crystallite size measured from a full width at half maximum of the peak with respect to the surface (002) of about 10 nm to about 45 nm in an X-ray diffraction spectrum of the carbonaceous core. The lithium battery including a negative electrode including the negative active material has improved capacity characteristics and ring lifetime characteristics.

13 Claims, 9 Drawing Sheets

(51) Int. Cl.
  *B05D 3/02* (2006.01)
  *H01M 4/04* (2006.01)
  *B82Y 30/00* (2011.01)
  *H01M 4/587* (2010.01)
  *H01M 10/0525* (2010.01)
  *C01B 31/02* (2006.01)
  *H01M 4/36* (2006.01)

(56) References Cited

U.S. PATENT DOCUMENTS

| | | |
|---|---|---|
| 2009/0269669 A1 | 10/2009 | Kim et al. |
| 2010/0021819 A1 | 1/2010 | Zhamu et al. |
| 2010/0285359 A1* | 11/2010 | Hwang et al. ............... 429/219 |

FOREIGN PATENT DOCUMENTS

| | | |
|---|---|---|
| JP | 08-335460 | 12/1996 |
| JP | 2000-100453 | 4/2000 |
| JP | 2001-266892 | 9/2001 |
| KR | 10-0250859 B1 | 1/2000 |
| KR | 2000-0058189 A | 9/2000 |
| KR | 1020050004930 A | 1/2005 |
| KR | 10-2009-0114130 A | 11/2009 |
| KR | 1020100008018 A | 1/2010 |
| KR | 1020100012020 A | 2/2010 |
| KR | 10-1030041 B1 | 4/2011 |
| WO | WO 02/096801 A1 | 12/2002 |
| WO | WO 02096801 A1 * | 12/2002 ............ C01B 31/14 |
| WO | WO 2009/106507 A2 | 9/2009 |

OTHER PUBLICATIONS

Registration Determination Certificate issued by the Korean Intellectual Property Office dated Aug. 31, 2012, 5 pages.

European Examination Report dated Jul. 3, 2014, issued in connection with corresponding EP Application No. 12165048.5.

Office Action issued on Mar. 24, 2015 in connection with corresponding Chinese Patent Application No. 201210140537.9.

* cited by examiner

_US 9,029,016 B2_

NEGATIVE ACTIVE MATERIAL, METHOD OF PREPARING THE SAME, AND LITHIUM BATTERY INCLUDING THE SAME

CROSS-REFERENCE TO RELATED APPLICATIONS

This application claims the benefit of Korean Patent Application No. 10-2011-0044074, filed on May 11, 2011, in the Korean Intellectual Property Office, the disclosure of which is incorporated herein in its entirety by reference.

BACKGROUND

1. Field

One or more embodiments relate to a negative active material, a method of preparing the same, and a lithium battery including the negative active material, and more particularly, to a negative active material with improved capacity characteristics and ring lifetime characteristics, a method of preparing the same, and a lithium battery including the negative active material.

2. Description of the Related Technology

Secondary lithium batteries used in portable electronic devices for information communication, such as personal digital assistances (PDAs), mobile phones, or notebook computers, electric bicycles, electronic vehicles, etc. have a discharge voltage that is at least 2 times greater than those of conventional batteries and thus exhibit high energy density.

A secondary lithium battery includes a positive electrode, a negative electrode, and either an organic electrolytic solution or a polymer electrolytic solution filling a space between the positive and negative electrodes, wherein the positive and negative electrodes each include an active material that allows lithium ions to be intercalated and deintercalated. In this structure, when lithium ions are intercalated and deintercalated between the positive and negative electrodes, oxidation and reduction reactions occur and thus, electrical energy is generated.

An example of a positive active material for a secondary lithium battery is an oxide that includes lithium and transition metal and has a structure enabling intercalation of lithium ions. Examples of the oxide are lithium cobalt oxide ($LiCoO_2$), lithium nickel oxide ($LiNiO_2$), and lithium nickel cobalt manganese oxide ($Li[NiCoMn]O_2$, $Li[Ni_{1-x-y}Co_xM_y]O_2$).

For use as a negative active material, research into various carbonaceous materials including artificial and natural graphite, hard carbon, and non-carbonaceous material such as silicon (Si), which allow lithium ions to be intercalated and deintercalated, is being performed.

Non-carbonaceous materials show very high capacity density that is at least 10 times greater than that of graphite. However, due to volumetric expansion and shrinkage during charging and discharging of lithium, the capacity retention rate, charge/discharge efficiency, and lifetime characteristics of the non-carbonaceous materials may decrease.

Accordingly, there is a need to develop high performance negative active materials having improved capacity characteristics and ring lifetime characteristics.

SUMMARY OF CERTAIN INVENTIVE ASPECTS

One or more embodiments include a negative active material that has improved capacity characteristics and ring lifetime characteristics.

One or more embodiments include a method of preparing a negative active material that has improved capacity characteristics and ring lifetime characteristics.

One or more embodiments include a lithium battery having improved capacity characteristics and ring lifetime characteristics.

Additional aspects will be set forth in part in the description which follows and, in part, will be apparent from the description, or may be learned by practice of the presented embodiments.

According to one or more embodiments, a negative active material includes: a carbonaceous core that has a sulfur content of from about 10 ppm to 900 ppm; and an amorphous carbon layer continuously formed on a surface of the carbonaceous core, wherein the carbonaceous core has a crystalloid plate structure, and a crystallite size measured from a full width at half maximum of the peak with respect to the surface (002) of about 10 nm to about 45 nm in an X-ray diffraction spectrum of the carbonaceous core.

The carbonaceous core has a peak with respect to a surface (002) at a Bragg angle 2θ of 26.4°±0.1° in the X-ray diffraction spectrum of the carbonaceous core.

The carbonaceous core has a full width at half maximum of the peak with respect to the surface (002) of about 0.2° to about 0.6 in the X-ray diffraction spectrum of the carbonaceous core.

The carbonaceous core has an interlayer spacing ($d_{002}$) of the surface (002) measured by X-ray diffraction of about 3.36 Å to about 3.37 Å.

The amorphous carbon layer may be a pitch coating.

The negative active material may be spherical or oval, and a longer direction particle size thereof $d_{50}$ is from about 1 μm to about 40 μm.

The negative active material has voids therein.

A BET specific surface area of the negative active material may be from about 1 $m^2/g$ to about 30 $m^2/g$.

A tap density of the negative active material may be from about 0.2 g/cc to 2.0 g/cc.

The negative active material may additionally include metal nanoparticles.

The metal nanoparticles may be selected from the group consisting of silicon (Si), tin (Sn), nickel (Ni), and a mixture thereof.

A size of the metal nanoparticles may be from about 1 nm to about 500 nm.

According to one or more embodiments, a method of preparing a negative active material includes: preparing a carbonaceous core; and forming an amorphous carbon layer on the carbonaceous core, wherein the carbonaceous core has a crystalloid plate structure, and a crystallite size measured from a full width at half maximum of the peak with respect to the surface (002) of about 10 nm to about 45 nm in an X-ray diffraction spectrum of the carbonaceous core.

The preparing of the carbonaceous core may include: preparing a carbonaceous material having a crystalloid plate structure; and forming the carbonaceous material in a spherical shape.

The preparing of the carbonaceous material having the crystalloid plate structure may include: expanding graphite by using an expanding agent; and heat treating the graphite.

The expanding agent may include at least one selected from the group consisting of a sulfuric acid, a nitric acid, a hydrochloric acid, an acetic acid, and a perchloric acid.

An amount of the expanding agent is from about 1 to about 70 parts by weight based on 100 parts by weight of the graphite.

The heat treatment may be performed at a temperature of about 400° C. to about 800° C.

According to one or more embodiments, a lithium battery includes: a positive electrode including a positive active material; a negative electrode including the negative active material described above; and an electrolytic solution interposed between the positive and negative electrodes.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF CERTAIN INVENTIVE EMBODIMENTS

A negative active material, a method of preparing the same, and a lithium battery including the negative active material will now be described in detail to embodiments, examples of which are illustrated in the accompanying drawings. In this regard, the embodiments may have different forms and should not be construed as being limited to the descriptions set forth herein. Accordingly, the embodiments are merely described below, by referring to the figures, to explain aspects of the present description.

As an aspect of the present embodiments, a negative active material according to an embodiment includes a carbonaceous core that has a sulfur content of about 10 ppm to 900 ppm; and an amorphous carbon layer continuously formed on a surface of the carbonaceous core, wherein the carbonaceous core has a crystalloid plate structure, and a crystallite size measured from a full width at half maximum of the peak with respect to the surface (002) of about 10 nm to about 45 nm in an X-ray diffraction spectrum of the carbonaceous core.

The sulfur content of the carbonaceous core may be from about 10 ppm to about 900 ppm, or about 10 ppm to about 700 ppm, or about 10 ppm to about 620 ppm.

The sulfur content indicates the residual content of a sulfuric acid that is used as an expanding agent when the carbonaceous core is prepared, and may be quantified by using inductively coupled plasma (ICP) emission spectrometer.

If the carbonaceous core has the sulfur content range described above, side reactions, for example, generation of $SO_2$ gas, may be prevented and thus, the amorphous carbon layer may be continuously formed on the surface of the carbonaceous core without cracks.

The negative active material including the amorphous carbon layer continuously formed, on the surface of the carbonaceous core is not divided into portions defined by interfaces and thus has a stable state. Thus, lithium may be easily intercalated or deintercalated, and a lithium battery including the negative active material has improved initial efficiency and lifetime characteristics.

The carbonaceous core may have a crystalloid plate structure.

Figure 8A:
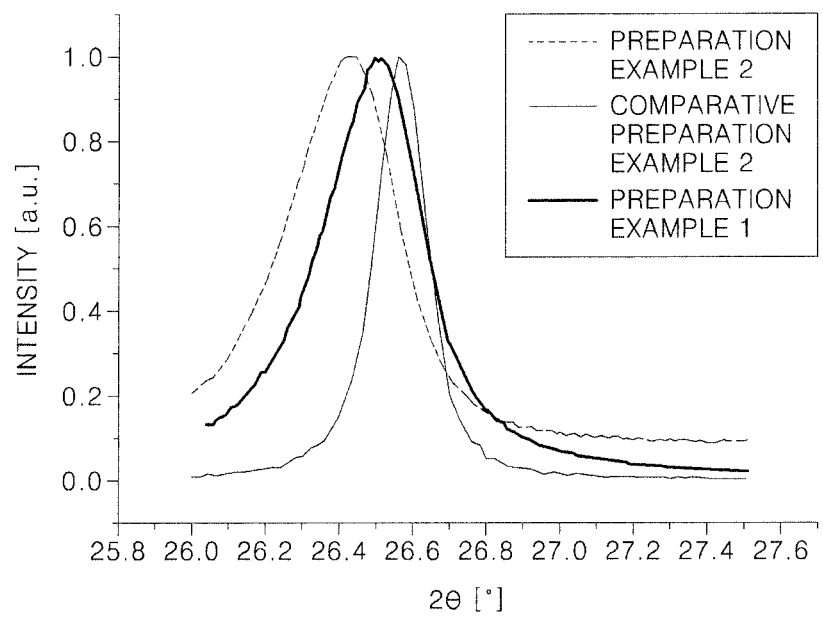
FIG. 8A shows X-ray diffraction analysis results of carbonaceous cores prepared according to Preparation Examples 1 and 2 and Comparative Preparation Example 2.

The crystal structure of the carbonaceous core may also be confirmed by referring to FIG. 8A that shows X-ray diffraction analysis results obtained using a CuK-alpha characteristic X-ray wavelength of 1.541 Å.

The crystallite size measured from the full width at half maximum of the peak with respect to the surface (002) in the X-ray diffraction spectrum of the carbonaceous core may be from about 10 nm to about 45 nm, for example, about 13 nm to about 40 nm. The crystallite size of the carbonaceous core may be calculated by substituting a value of the full width at half maximum of the peak with respect to the surface (002) in the X-ray diffraction spectrum to a Scherrer's equation.

$$\tau = \frac{K\lambda}{\beta\cos\theta}$$

The carbonaceous core may have a peak with respect to the surface (002) at a Bragg angle 2θ of 26.4°±0.1°, for example, 26.4° to 26.5° in the X-ray diffraction spectrum of the carbonaceous core.

The carbonaceous core may have a full width at half maximum of the peak with respect to the surface (002) in the X-ray diffraction spectrum of about 0.2° to about 0.6°, for example, about 0.3° to about 0.5°.

The carbonaceous core may have an interlayer spacing ($d_{002}$) of the surface (002) measured by X-ray diffraction of about 3.36 Å to about 3.37 Å, for example, about 3.361 Å to about 3.37 Å. The surface interval ($d_{002}$) of the surface (002) of the carbonaceous core may be calculated by substituting a value of a Bragg angle 2θ at which a peak of the surface (002) is present in the X-ray diffraction spectrum obtained by X-ray diffraction analysis into a Bragg equation.

From the results described above, it is confirmed that unlike typical hard carbon, the carbonaceous core is a carbonaceous material with high crystallinity.

The carbonaceous core may have a plate structure. The plate structure may include a deformed plate structure, such as a bent plate structure, a plate structure with a curved end, a plate structure with a partially defect portion, etc. The "plate structure" of the carbonaceous core may be easily understood by referring to the carbonaceous core shown in FIG. 1A.

The carbonaceous core may include a polycyclic nano-sheet including fused carbon atom rings that are aligned on a plane, and n polycyclic nano-sheets may be stacked in a direction perpendicular to the plane. The n may be an integer of 2 to 50, or an integer of 2 to 40, or an integer of 2 to 30.

Each carbon atom ring may refer to, for example, a ring that consists of 6 carbon atoms connected in a hexagonal shape.

The term "cycle that consists of 6 carbon atoms connected in a hexagonal shape" used herein refers to a hexagonal ring in which carbon is located at each vertex. Hereinafter, this term will also be referred to as "6-membered carbon cycle." The polycyclic nano-sheet has a plurality of 6-membered carbon rings, which are fused to form a beehive shape, aligning on a plane. In this case, the wording "aligning on a plane" refers to aligning and extending of a plurality of laterally fused 6-membered carbon rings. For example, the wording "aligning on a plane" does not include aligning and extending of vertically fused 6-membered carbon rings.

Among carbons of the polycyclic nano-sheet, adjacent carbons may be bonded to each other via a sp2 bond. By doing so, a resonance structure may be formed in the 6-membered carbon ring and thus, electrons migrate easily.

Since the polycyclic nano-sheet consists of a plurality of 6-membered carbon rings that are fused and aligned on a plane, a thickness of the polycyclic nano-sheet may be, for example, carbon atom particle size ±0.1 nm. In this regard, the thickness of the polycyclic nano-sheet, for example, carbon atom particle size ±0.1 nm, is determined in consideration of presence of a bent polycyclic nano-sheet, or a polycyclic nano-sheet with a curved end, or a polycyclic nano-sheet with a partially defect portion.

The carbonaceous core may have the stack of n polycyclic nano-sheets as described above. In this case, the n polycyclic nano-sheets may be stacked in a direction perpendicular to the plane on which a plurality of 6-membered carbon rings of the polycyclic nano-sheet are fused and aligned.

n may be an integer of 2 to 50, or an integer of 2 to 40, or an integer of 2 to 30, or an integer of 2 to 20.

Regarding the carbonaceous core, from among carbons of the n polycyclic nano-sheets, a first carbon and a second carbon, which satisfy an inequality $L_1 \geq L_2$ (where $L_1$ refers to a distance between the first carbon and the second carbon, and $L_2$ refers to a distance between a third carbon and a fourth carbon, wherein the third carbon is selected from carbons of the n polycyclic nano-sheets other than the first carbon and the second carbon, and the fourth carbon is selected from carbons of the n polycyclic nano-sheets other than the first carbon, the second carbon, and the third carbon), are selected. When the first carbon is positioned at the origin A (0, 0, 0) of a three-dimensional coordinate system having an x-axis, a y-axis, and a z-axis, the second carbon may have a coordinate B (a, b, c), where a and b are each independently 10 μm or less and c may be 100 nm or less. In this regard, $L_1$ refers to a distance between the first carbon and the second carbon, and $L_2$ refers to a distance between the third carbon and the fourth carbon, wherein the third carbon is selected from carbons of the n polycyclic nano-sheets other than the first carbon and the second carbon, and the fourth carbon is selected from carbons of the n polycyclic nano-sheets other than the first carbon, the second carbon, and the third carbon. For example, the first carbon and the second carbon may refer to two carbons that are spaced apart from each other at the most among any two carbons selected from carbons of the n polycyclic nano-sheets.

a and b may be each independently 10 μm or less, or about 0.1 μm to about 10 μm. For example, a and b may each be about 1 μm to about 10 μm. a and b may respectively indicate a width and a length in a perpendicular direction to a thickness direction of the carbonaceous material.

c may be 100 nm or less, or about 0.5 nm to about 100 nm, or about 0.5 nm to about 90 nm, or about 0.5 nm to about 50 nm. For example, c may be about 0.5 nm to about 20 nm, but is not limited thereto. c may indicate a length of the thickness direction of the carbonaceous material.

Accordingly, the carbonaceous core may be, for example, nanoparticles powder having the plate structure.

If the carbonaceous core has such ranges of a, b and c, although not wishing to be limited to a particular theory, electrons may migrate easily and thus the carbonaceous core has excellent conductivity The amorphous carbon layer formed on the surface of the carbonaceous core may be a pitch coating.

A pitch source available for use herein may be, for example, a petroleum-based material or a coal-based material, and examples thereof are a coal-tar pitch, a petroleum pitch, an organic synthesis pitch prepared by polymerization-fusing of a fused polycyclic aromatic hydrocarbon compound, and an organic synthesis pitch obtained by polymerization-fusing of a hetero atom-containing fused polycyclic aromatic hydrocarbon compound. For example, the pitch source may be a coal-tar pitch, but is not limited thereto, and any one of various pitch sources available in the art may be used herein.

The pitch coating may be formed by, for example, carbonating the pitch source through heat treatment. Due to the heat treatment, conductivity of the negative active material may be improved.

The amorphous carbon layer may be formed as a pitch coating having a thickness of about 1 nm to about 50 nm, for example, about 5 nm to about 20 nm.

If the thickness of the pitch coating is within the ranges described above, a negative active material having improved conductivity may be formed.

The negative active material may be, for example, spherical or oval, and a longer direction particle size of the negative active material, for example, $d_{50}$ may be from about 1 μm to about 40 μm, for example about 5 μm to about 20 μm. Examples of the surface and shape of the negative active material may be seen by referring to FIGS. 2 and 3, which will be described below. The definition of $d_{50}$ may be easily understood by one of ordinary skill in the art, and may be seen by referring to FIG. 7, which will be described below.

When the negative active material is spherical or oval, the negative active material may provide flexibility when slurry and an electrode plate are prepared. A negative active material having the $d_{50}$ range described above may be suitable for the preparation of slurry, and may allow a negative electrode to be uniformly surface-coated when the negative electrode is manufactured.

The core of the negative active material may have voids. The voids may be amorphous and may be at least two voids. The pores may extend to a surface of the negative active material and may be exposed to the outside. Alternatively, the pores may be present only inside the negative active material. The presence and shape of the voids in the negative active material are confirmed by referring to FIG. 6.

The voids are not present in hard carbon or conventional graphite used as a negative active material. Due to the voids, a contact area between the negative active material and lithium ions may be widened. Thus, the negative active material provides excellent capacity characteristics and ring lifetime characteristics to a battery including the negative active material.

A porosity of the negative active material may be from about 1% to about 40%, or about 2% to about 10%. The porosity may refer to a percent of a total volume of voids based on a total volume of the negative active material.

A BET specific surface area of the negative active material may be from about 1 m$^2$/g to about 30 m$^2$/g, or about 1 m$^2$/g to about 18 m$^2$/g, or about 1 m$^2$/g to about 5 m$^2$/g. The BET specific surface area of the negative active material is measured by a 'nitrogen adsorption BET specific surface area measurement device (ASAP2400') manufactured by Micro Meritex Co. Ltd (Sayama City, Japan).

A negative active material having the BET specific surface area range described above may have excellent capacity characteristics and ring lifetime characteristics.

A tap density of the negative active material may be from about 1.0 g/cc to about 2.0 g/cc, for example, about 1.0 g/cc to about 1.9 g/cc. The tap density is evaluated according to JIS-K5101 by using 'powder tester PT-R' manufactured by Hosokawha Micron Co., Ltd. For example, the negative active material is dropped to a 20 cc-capacity tapping cell through a sieve having a scale interval of 200 μm until the tapping cell is completely filled. Then, tapping is performed thereon 3000 times with a stroke length of 18 mm once per second, and then, a tap density of the tapped negative active material is measured.

A negative active material having the tap density range described above may suitable for sustaining the sulfur content of about 10 ppm to about 900 ppm in the carbonaceous core and the amorphous carbon layer continuously formed on the carbonaceous core. Thus, lithium may be easily intercalated and deintercalated and thus, a lithium battery including the negative active material may have improved initial efficiency and lifetime characteristics.

The negative active material may further include metal nanoparticles.

A negative active material including metal nanoparticles may have, in addition to improved capacity characteristics and ring lifetime characteristics, improved conductivity.

Metal nanoparticles may be selected from the group consisting of silicon (Si), tin (Sn), nickel (Ni), and a mixture thereof. A size of the metal nanoparticles may be from about 1 nm to about 500 nm.

If the size of the metal nanoparticles is within the range described above, the destruction of the negative active material due to volumetric expansion of metal nanoparticles, such as Si particles during charging and discharging may be effectively reduced.

An average particle size of the negative active material that additionally includes metal nanoparticles may be from about 3 μm to about 60 μm, for example, about 3 μm to about 50 μm.

The average particle size ranges of the negative active material described above are appropriate for slurry preparation and handling. If the average particle size of the negative active material is within the ranges described above, a final BET specific surface area is from about 3 m$^2$/g to about 20 m$^2$/g and thus, formation of a solid electrolyte interface (SEI) on a surface of a negative electrode may be appropriately controlled.

As another aspect of the present embodiments, a method of preparing a negative active material according to an embodiment includes preparing a carbonaceous core; and forming an amorphous carbon layer on the carbonaceous core, wherein the carbonaceous core has a crystalloid plate structure, and a crystallite size measured from a full width at half maximum of the peak with respect to the surface (002) of about 10 nm to about 45 nm in an X-ray diffraction spectrum of the carbonaceous core.

The preparing of the carbonaceous core may include preparing a carbonaceous material having a crystalloid plate structure; and forming the carbonaceous material in a spherical shape.

The preparing of the carbonaceous material having a crystalloid plate structure may include expanding graphite by using an expanding agent; and heat treating the expanded graphite.

The expanding of graphite by using an expanding agent may include immersing graphite in a solution including an expanding agent for about 1 to about 24 hours. However, the expanding method is not limited thereto, and any one of various methods for preparing expanded graphite may be used herein.

The expanding agent may include at least one selected from the group consisting of a sulfuric acid, a nitric acid, a hydrochloric acid, an acetic acid, and a perchloric acid. For example, the expanding agent may include at least one selected from the group consisting of a sulfuric acid, a nitric acid, and an acetic acid. For example, the expanding agent may be a mixed solution including a sulfuric acid and an acetic acid at a mole ratio of 1:5 to 5:1.

An amount of the expanding agent may be from about 1 to about 70 parts by weight, or about 1 to about 50 parts by weight, based on 100 parts by weight of graphite.

If graphite is expanded by using an expanding agent having the amount ranges described above, the carbonaceous core of the negative active material may have a sulfur content of about 10 ppm to about 900 ppm. Thus, side reactions, for example generation of SO$_2$ gas, may be prevented and thus, the amorphous carbon layer may be continuously formed on the surface of the carbonaceous core without cracks.

Accordingly, lithium is easily intercalated and deintercalated, which leads to production of a lithium battery including the carbonaceous core with improved initial efficiency and lifetime characteristics.

A heat treatment temperature may be from about 400° C. to about 800° C., for example, about 400° C. to about 700° C. A heat treatment time may be from about 30 minutes to about 3 hours, for example, 30 minutes to 2 hours.

Furthermore, a solvent may be added to the expanded graphite and the expanded graphite in the solvent is pulverized.

As the solvent, a material that does not substantially react with the expanded graphite and provides fluidity may be used. Nonlimiting examples of the solvent are alcohols (for example, ethanol).

Subsequently, the expanded graphite included in the solvent is pulverized. As a pulverizing method, a method using a homogenizer, a method using a micro fluidizer, etc. may be used. The pulverizing method may be repeatedly performed a few times. Alternatively, different pulverizing methods may each be used at least twice. Meanwhile, before the expanded graphite is pulverized, the expanded graphite may be mixed with an acid.

Thereafter, the solvent used is removed from the pulverized product and the resultant graphite particles are aggregated to form a spherical carbonaceous core.

The removal of the solvent may be performed by using various methods in consideration of, for example, a boiling point of the solvent. For example, the pulverized product is filtered and washed, and then heat treated at a temperature of 80° C.

The carbonaceous core may have a crystalloid plate structure, and a crystallite size measured from a full width at half maximum of the peak with respect to the surface (002) in the X-ray diffraction spectrum of the carbonaceous core may be from about 10 nm to about 45 nm, for example, about 13 nm to about 40 nm.

In the forming of an amorphous carbon layer on a carbonaceous core, for example, a pitch is provided to the surface of the carbonaceous core and then heat treated to form an amorphous carbon layer.

Examples of the pitch are a coal-tar pitch, a petroleum pitch, an organic synthesis pitch prepared by polymerization-fusing of a fused polycyclic aromatic hydrocarbon compound, and an organic synthesis pitch obtained by polymerization-fusing of a hetero atom-containing fused polycyclic aromatic hydrocarbon compound. For example, the pitch may be a coal-tar pitch. For example, a pitch may be provided to the surface of the carbonaceous core by chemically depositing carbon. However, the pitch formation method is not limited thereto, and may be any one of various methods available in the art.

The forming of the amorphous carbon layer may include heat treating at a temperature of about 700° C. to about 2000° C., for example, 800° C. to 2000° C., for 30 minutes to 72 hours. However, the heat treatment temperature and time are not limited thereto. The heat treatment process may be performed to carbonate the pitch provided to the surface of the carbonaceous core in an inert gas atmosphere or a non-acidic atmosphere.

If the heat treatment temperature and time are within the ranges described above, crystallinity of the negative active material may be improved. A lithium battery including the negative active material may have improved capacity characteristics and lifetime characteristics.

As another aspect of the present embodiments, a lithium battery according to an embodiment includes a positive electrode including a positive active material; a negative electrode including a negative active material as described above; and an electrolytic solution interposed between the positive and negative electrodes. In this regard, the negative active material may include a carbonaceous core that has a sulfur content of about 10 ppm to 900 ppm; and an amorphous carbon layer continuously disposed on a surface of the carbonaceous core, wherein the carbonaceous core has a crystalloid plate structure and a crystallite size measured from a full width at half maximum of the peak with respect to the surface (002) of about 10 nm to about 45 nm in an X-ray diffraction spectrum of the carbonaceous core. Such a negative active material may enable effective intercalation and deintercalation of lithium ions, and accordingly, a lithium battery including the negative active material may have high capacity and long lifetime.

The positive electrode includes a current collector and a positive active material layer disposed on the current collector. An example of a positive active material that is used to form the positive active material layer is a compound that allows lithium to be reversibly intercalated and deintercalated, for example, a lithiumated intercalation compound. Examples of the positive active material are: $Li_aA_{1-b}X_bD_2$ (where $0.95 \leq a \leq 1.1$, and $0 \leq b \leq 0.5$); $Li_aE_{1-b}X_bO_{2-c}D_c$ (where $0.95 \leq a \leq 1.1$, $0 \leq b \leq 0.5$, and $0 \leq c \leq 0.05$); $LiE_{2-b}X_bO_{4-c}D_c$ (where $0 \leq b \leq 0.5$, and $0 \leq c \leq 0.05$); $Li_aNi_{1-b-c}Co_bBcD_\alpha$ (where $0.95 \leq a \leq 1.1$, $0 \leq b \leq 0.5$, $0 \leq c \leq 0.05$, and $0 < \alpha \leq 2$); $Li_aNi_{1-b-c}Co_bX_cO_{2-\alpha}M_2$ (where $0.95 \leq a \leq 1.1$, $0 \leq b \leq 0.5$, $0 \leq c \leq 0.05$, and $0 < \alpha < 2$); $Li_aNi_{1-b-c}Co_bX_cO_{2-\alpha}M_2$ (where $0.95 \leq a \leq 1.1$, $0 \leq b \leq 0.5$, $0 \leq c \leq 0.05$, and $0 < \alpha < 2$); $Li_aNi_{1-b-c}Mn_bX_cD_\alpha$ (where $0.95 \leq a \leq 1.1$, $0 \leq b \leq 0.5$, $0 \leq c \leq 0.05$, and $0 < \alpha \leq 2$); $Li_aNi_{1-b-c}Mn_bX_cO_{2-\alpha}M_2$ (where $0.95 \leq a \leq 1.1$, $0 \leq b \leq 0.5$, $0 \leq c \leq 0.05$, and $0 < \alpha < 2$); $Li_aNi_{1-b-c}Mn_bX_cO_{2-\alpha}M_2$ (where $0.95 \leq a \leq 1.1$, $0 \leq b \leq 0.5$, $0 \leq c \leq 0.05$, and $0 < \alpha < 2$); $Li_aNi_bE_cG_dO_2$ (where $0.90 \leq a \leq 1.1$, $0 \leq b \leq 0.9$, $0 \leq c \leq 0.5$, and $0.001 \leq d \leq 0.1$); $Li_aNi_bCo_cMn_dG_eO_2$ (where $0.90 \leq a \leq 1.1$, $0 \leq b \leq 0.9$, $0 \leq c \leq 0.5$, and $0 \leq d \leq 0.5$, and $0 \leq e \leq 0.1$); $Li_aNiG_bO_2$ (where $0.90 \leq a \leq 1.1$, and $0.001 \leq b \leq 0.1$); $Li_aCoG_bO_2$ (where $0.90 \leq a \leq 1.1$, and $0.001 \leq b \leq 0.1$); $Li_aMnG_bO_2$ (where $0.90 \leq a \leq 1.1$, and $0.001 \leq b \leq 0.1$); $Li_aMn_2G_bO_4$ (where $0.90 \leq a \leq 1.1$, and $0 \leq b \leq 0.1$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); $LiFePO_4$; and lithium titanate.

In these chemical formulae, A is selected from the group consisting of Ni, Co, Mn, and a combination thereof, but is not limited thereto; X is selected from the group consisting of Al, Ni, Co, Mn, Cr, Fe, Mg, Sr, V, rare-earth elements, and a combination thereof, but is not limited thereto; D is selected from the group consisting of O, F, S, P, and a combination thereof, but is not limited thereto; E is selected from the group consisting of Co, Mn, and a combination thereof, but is not limited thereto; M is selected from the group consisting of F, S, P, and a combination thereof, but is not limited thereto; G is selected from the group consisting of Al, Cr, Mn, Fe, Mg, La, Ce, Sr, V, and a combination thereof, but is not limited thereto; Q is selected from the group consisting of Ti, Mo, Mn, and a combination thereof, but is not limited thereto; Z is selected from the group consisting of Cr, V, Fe, Sc, Y, and a combination thereof, but is not limited thereto; and J is selected from the group consisting of V, Cr, Mn, Co, Ni, Cu, and a combination thereof, but is not limited thereto. For example, the positive active material may be lithium titanate.

The lithium titanate may include, according to a crystal structure, a spinel type lithium titanate, an anatase type lithium titanate, a ramsdellite type lithium titanate, etc.

In detail, the positive active material may be represented by $Li_{4-x}Ti_5O_{12}$ ($0 \leq x \leq 3$). For example, the positive active material may be $Li_4Ti_5O_{12}$, but is not limited thereto.

A detailed example of the positive active material may be $Li_aNi_bCo_cMn_dG_eO_2$ (where $0.90 \leq a \leq 1.1$, $0 \leq b \leq 0.9$, $0 \leq c \leq 0.5$, $0 \leq d \leq 0.5$, and $e=0$, for example, $a=1$, $b=0.5$, $c=0.2$, $d=0.3$, and $e=0$), $LiMn_2O_4$, etc., but is not limited thereto.

Meanwhile, a lithium electrode may be used as the positive electrode.

A coating layer may be additionally formed on a surface of these compounds as the positive active material. Alternatively, these compounds may be mixed with a compound including a coating layer. The coating layer may include at least one coating element compound selected from the group consisting of oxide of a coating atom, hydroxide of a coating atom, oxycarbonate of a coating atom, and hydroxycarbonate of a coating atom. The coating atom compound of the coating layer may be amorphous or crystalloid. The coating atom in the coating layer may be Mg, Al, Co, K, Na, Ca, Si, Ti, V, Sn, Ge, Ga, B, As, Zr or a mixture thereof.

In a method of forming the coating layer, these compounds may be coated with the coating elements described above by using any method that does not affect properties of the positive active material. Such a method may be, for example, a spray coating method or an immersion method. These coating methods may be obvious to one of ordinary skill in the art and thus are not described herein in detail.

The positive active material layer may also include a binder.

The binder allows positive active material particles to be attached to each other, and also, attaches the positive active material to the current collector. Examples of the binder are polyvinylalcohol, carboxymethylcellulose, hydroxypropylcellulose, diacetylcellulose, polyvinylchloride, carboxylated polyvinylchloride, polyvinylfluoride, a polymer including ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, and nylon. However, the binder is not limited to these materials.

The current collector may include Al, but is not limited thereto.

To prepare the positive electrode, a positive active material and a binder (selectively, including a conductive material) are mixed in a solvent to prepare a composition for forming the positive active material layer, and the composition is applied to a current collector. Since the method of manufacturing the positive electrode is well known in the art, the method will not be described in detail in the present specification. The solvent may be, but is not limited to, N-methylpyrrolidone.

The positive active material layer may also include a conductive material. The conductive material may include at least one selected from the group consisting of carbon black, ketjen black, acetylene black, artificial graphite, natural graphite, copper powder, nickel powder, aluminum powder, silver powder, and polyphenylene, but is not limited thereto.

As described above, the negative electrode may include a negative active material including a carbonaceous core that has a sulfur content of about 10 ppm to 900 ppm; and an amorphous carbon layer continuously formed on a surface of the carbonaceous core. Also, according to a performance of the lithium battery, the negative active material may be used in combination of at least one selected from the group consisting of natural graphite, silicon/carbon composite ($SiO_x$), silicon metal, silicon film, lithium metal, lithium alloy, carbonaceous materials, and graphite. An example of the lithium alloy is lithium titanate. The lithium titanate, according to a crystal structure, may include a spinel-shaped lithium titanate, an anatase-shaped lithium titanate, ramsdellite-shaped lithium titanate, etc.

In a composition for forming a negative active material layer, a binder and a solvent may be the same as described with respect to the positive electrode. A conductive material which is selectively included in the composition for forming a negative active material layer may be understood by referring to the description above. In some cases, the composition for forming the positive active material layer and the composition for forming the negative active material layer may further include a plasticizer to form pores in an electrode plate.

The electrolytic solution includes a non-aqueous organic solvent and a lithium salt.

The non-aqueous organic solvent may act as a medium through which ions involving in an electrochemical reaction of the lithium battery may be transported.

The non-aqueous organic solvent may be a carbonate-based solvent, an ester-based solvent, an ether-based solvent, a ketone-based solvent, an alcohol-based solvent, or an aprotic solvent. Examples of the carbonate-based solvent are dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), and butylene carbonate (BC). Examples of the ester-based solvent are methyl acetate, ethyl acetate, n-propyl acetate, dimethylacetate, methylpropionate, ethylpropionate, γ-butyrolactone, decanolide, valerolactone, mevalonolactone, and caprolactone. Examples of the ether-based solvent are dibutylether, tetraglyme, diglyme, dimethoxyethane, 2-methyltetrahydrofurane, and tetrahydrofurane. An example of the ketone-based solvent is cyclohexanone. Examples of the alcohol-based solvent include ethylalcohol and isopropyl alcohol. Examples of the aprotic solvent are: nitriles such as R—CN where R is a linear, branched, or cyclic C2 to C20 hydrocarbon group and has a double-bond aromatic ring or ether bond; amides such as dimethylformamide; and dioxolane-based sulfolanes such as a 1,3-dioxolane sulfolane.

These non-aqueous organic solvents may be used alone or in combination thereof. If these non-aqueous organic solvents are used in combination, the mixture ratio may be appropriately controlled according to a desired battery performance and may be obvious to one of ordinary skill in the art.

The lithium salt is dissolved in an organic solvent, acts as a lithium ion supplier in the lithium battery to operate the lithium battery, and promotes movement of lithium ions between the positive and negative electrodes. The lithium salt may include at least one supporting electrolytic salt selected from the group consisting of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ where x and y are natural numbers, LiCl, LiI and $LiB(C_2O_4)_2$[lithium bis(oxalato) borate; LiBOB]. The concentration of the lithium salt may be in a range of about 0.1 to about 2.0 M. If the concentration of the lithium salt is within this range, an electrolyte has appropriate levels of conductivity and viscosity and thus exhibits excellent electrolytic performance, and lithium ions may migrate effectively.

According to the type of the lithium battery, a separator may be further disposed between the positive and negative electrodes. Examples of the separator are a polyethylene single layer, a polypropylene single layer, a polyvinylidene fluoride single layer, a combination thereof, a polyethylene/polypropylene double-layered structure, a polyethylene/polypropylene/polyethylene triple-layered structure, and a polypropylene/polyethylene/polypropylene triple-layered structure.

The lithium battery may be a lithium ion battery, a lithium ion polymer battery or a lithium polymer battery, according to the separator used and the electrolyte used. Also, the lithium battery may be a cylindrical lithium battery, a rectangular lithium battery, a coin-like lithium battery, or a pouch-like lithium battery, according to the battery shape. Also, the lithium battery may be a bulky lithium battery or a thin lithium battery according to the battery size. Also, the lithium battery according to the present embodiment may be a primary battery or a secondary battery. Methods of manufacturing the batteries described above are obvious to one of ordinary skill in the art and thus detailed description thereof will not be described herein.

Figure 9:
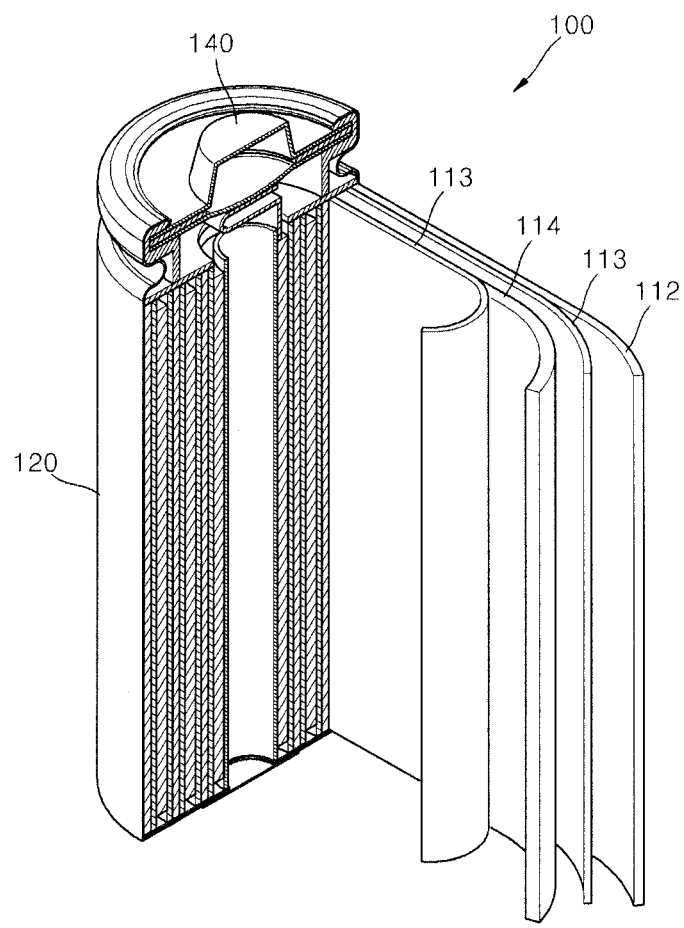
FIG. 9 is an exploded perspective view of a lithium battery according to an embodiment.

FIG. 9 is an exploded perspective view of a lithium battery 100 according to an embodiment. Referring to FIG. 9, the lithium battery 100 includes a positive electrode 114, a negative electrode 112, a separator 113 interposed between the positive electrode 114 and the negative electrode 112, an electrolyte (not shown) with which the positive electrode 114, the negative electrode 112, and the separator 113 are immersed, a battery case 120, and a sealing member 140 for sealing the battery case 120. The lithium battery 100 of FIG. 9 is formed by sequentially stacking the positive electrode 114, the negative electrode 112, and the separator 113 and then rolling the resultant structure and placing the rolled structure in the battery case 140.

The present embodiments will be described in further detail with reference to the following examples. These examples are for illustrative purposes only and are not intended to limit the scope of the present embodiments.

EXAMPLES

Preparation of Carbonaceous Core

Preparation Example 1

100 parts by weight of graphite (sp270, Japan graphite) was immersed in an expansion solution of 30 parts by weight of a mixed solution including a sulfuric acid and an acetric acid at a mole ratio of 1:2 and stirred for 120 minutes, and then expanded graphite and acidic powder were washed, and separated by filtering under reduced pressure, thereby isolating the expanded graphite.

The expanded graphite was heated at a temperature of 400° C. for 1 hour, and gas generated therefrom was exhausted through an exhaust pipe, and the result was dispersed in ethanol and pulverized by using a homogenizer at a rate of 12000 rpm for 10 minutes. The resultant mixture was additionally pulverized by using a micro fluidizer, filtered by using a filtering device, washed using ethanol, and then, dried in an oven at a temperature of 120° C., thereby preparing carbonaceous core powder.

Figure 1A:
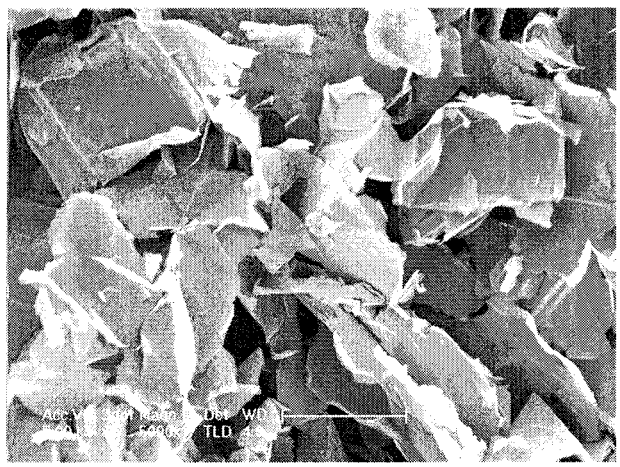
FIG. 1A shows a scanning electron microscopy (SEM) image of a carbonaceous core prepared according to Preparation Example 1.

FIG. 1A shows a scanning electron microscopy (SEM) image of the carbonaceous core powder prepared according to Preparation Example 1. Referring to FIG. 1A, individual carbonaceous core nanoparticles contained in the carbonaceous core powder have commonly a crystalloid plate structure.

Figure 1B:
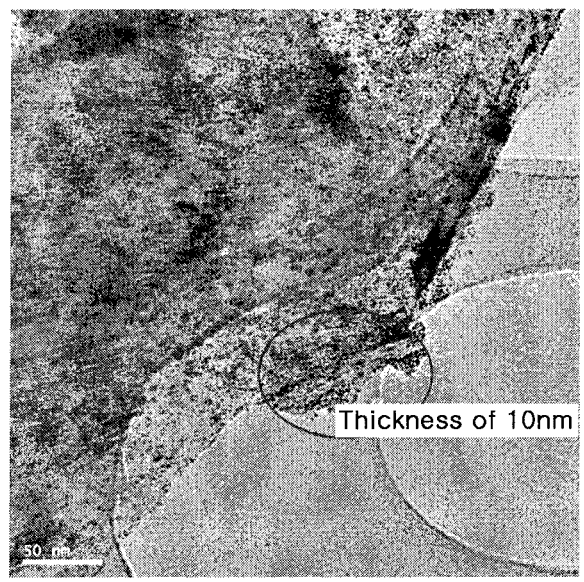
FIG. 1B shows a transmission electron microscope (TEM) image of a carbonaceous core prepared according to Preparation Example 1.

FIG. 1B shows a transmission electron microscope (TEM) image of a carbonaceous core prepared according to Preparation Example 1. In FIG. 1B, a portion indicated by a doted circle indicates, for example, sides of the carbonaceous core nanoparticles of the crystalloid plate structure of FIG. 1A, and it was confirmed that a thickness of the carbonaceous core nanoparticles of the crystalloid plate structure was about 10 nm. Accordingly, from FIG. 1B, it was confirmed that c ("c" is already defined above) of the carbonaceous core nanoparticles prepared as described above is about 10 nm.

Meanwhile, a size distribution of the carbonaceous core nanoparticles was evaluated by using Melvern, Hydro2000. Regarding a or b ("a" and "b" are already defined above) of the carbonaceous core nanoparticles, it was confirmed that $d_{10}$ is 2.1 micrometers, $d_{50}$ is 4.11 micrometers, and $d_{90}$ is 7.16 micrometers.

The carbonaceous core powder was loaded into a device for forming a round shape (product of Nara Machine Co., Ltd, model name: NHS), and then the device was driven at a rate of 13500 rpm for 10 minutes to prepare carbonaceous core.

Preparation Example 2

A carbonaceous core was prepared in the same manner as in Preparation Example 1, except that Si particle powder having a particle size of 300 nm was added to the carbonaceous core.

Comparative Preparation Example 1

100 parts by weight of graphite (sp270, Japan graphite) was immersed in an expansion solution of 30 parts by weight of a sulfuric acid and stirred for 120 minutes, and then expanded graphite and acidic powder were washed, and separated by filtering under reduced pressure, thereby isolating the expanded graphite.

The expanded graphite was heated at a temperature of 400° C. for 1 hour, and gas generated therefrom was exhausted through an exhaust pipe, and the result was dispersed in ethanol and pulverized by using a homogenizer at a rate of 12000 rpm for 10 minutes. The resultant mixture was additionally pulverized by using a micro fluidizer, filtered by using a filtering device, washed using ethanol, and then, dried in an oven at a temperature of 120° C., thereby preparing carbonaceous core powder.

The carbonaceous core powder was loaded into a device for forming a round shape (product of Nara Machine Co., Ltd, model name: NHS), and then the device was driven at a rate of 13500 rpm for 10 minutes to prepare a carbonaceous core.

The carbonaceous core was heat treated at a temperature of 1000° C. for 1 hour to prepare a carbonaceous core that has a cracked surface portion.

Comparative Preparation Example 2

A carbonaceous core was prepared in the same manner as in Preparation Example 1, except that instead of the carbonaceous core powder, graphite (MSG product) was used instead of carbonaceous core powder.

Comparative Preparation Example 3

A carbonaceous core was prepared in the same manner as in Preparation Example 1, except that instead of the carbonaceous core powder, 100 parts by weight of graphite (MSG product) was immersed in 30 parts by weight of a sulfuric acid and dried.

Comparative Preparation Example 4

A carbonaceous core was prepared in the same manner as in Preparation Example 1, except that instead of the carbonaceous core powder, needle cork (Nippon Steel Corporation, 25 μm) was heat treated in an inert gas atmosphere at a temperature of 1100° C. to remove impurities. 5 g of the needle cork source was placed in a reactor containing an aqueous solution including 37.5 g of sodium chlorate ($NaClO_3$) and 150 mL of nitric acid (70%) and stirred at a temperature of 25° C. for 24 hours, followed by washing with distilled water to prepare oxidized graphite powder.

Preparation of Negative Active Material

Example 1

100 parts by weight of the carbonaceous core prepared according to Preparation Example 1 was treated with 20 parts by weight of a coal-tar pitch. The carbonaceous core having a surface on which the coal-tar pitch was formed was heat treated in an $N_2$ atmosphere at a temperature of 1000° C. for 1 hour, thereby preparing a negative active material in which the coal-tar pitch was continuously formed on the surface of the carbonaceous core.

Figure 2:
FIG. 2 shows a SEM image of a negative active material prepared according to Example 1.
Figure 3:
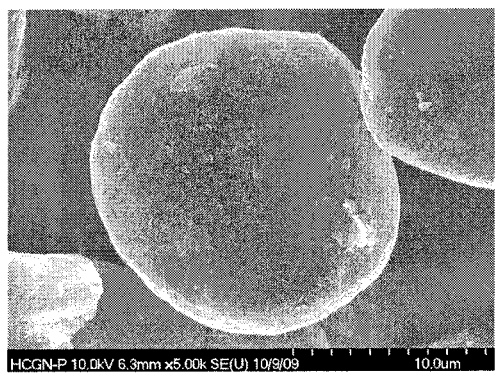
FIG. 3 shows an enlarged SEM image at 10× magnification of a negative active material prepared according to Example 1.

FIGS. 2 and 3 show SEM images of the negative active material prepared according to Example 1. Referring to FIGS. 2 and 3, the negative active material is spherical or oval, and the negative active material has a smooth surface.

Figure 6:
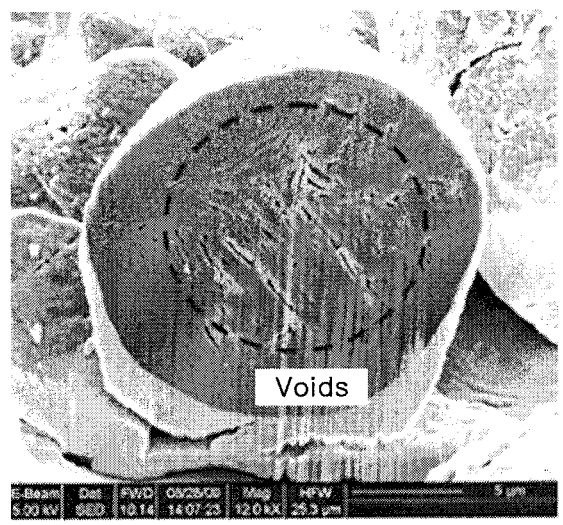
FIG. 6 shows a TEM image of a cross-section of a negative active material particle according to an embodiment.

FIG. 6 shows a transmission electron microscope (TEM) image of the negative active material. Referring to FIG. 6, it was formed that the negative active material had voids.

Figure 7:
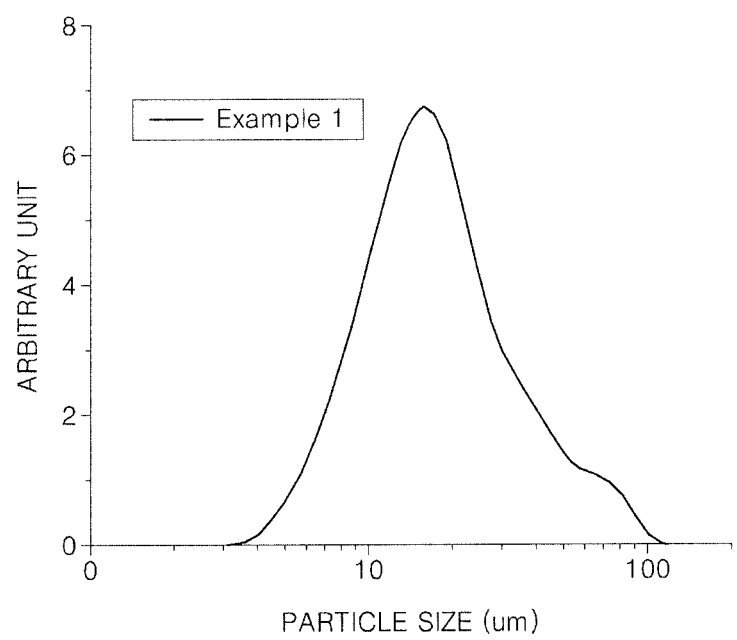
FIG. 7 shows size distribution results of a negative active material according to an embodiment.

FIG. 7 is a graph of a longer direction particle size dispersion of the negative active material measured by using Melvern, Hydro2000. Referring to FIG. 7, it was confirmed that the longer direction particle size of the negative active material, for example, $d_{50}$ was 12 micrometers.

Example 2

A negative active material was prepared in the same manner as in Example 1, except that instead of the carbonaceous core prepared according to Preparation Example 1, the carbonaceous core prepared according to Preparation Example 2 was used.

Comparative Example 1

A negative active material was prepared in the same manner as in Example 1, except that instead of the carbonaceous core prepared according to Preparation Example 1, the carbonaceous core prepared according to Comparative Preparation Example 1 was treated with a coal-tar pitch, and the resultant product in which the coal-tar pitch was formed on the surface of the carbonaceous core was heat treated in an $N_2$ atmosphere at a temperature of 1000° C. for 1 hour to form cracks in a portion of the surface of the carbonaceous core.

Figure 4:
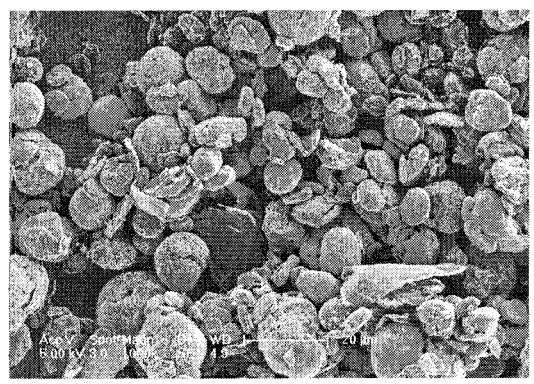
FIG. 4 shows a SEM image of a negative active material prepared according to Comparative Example 1.
Figure 5:
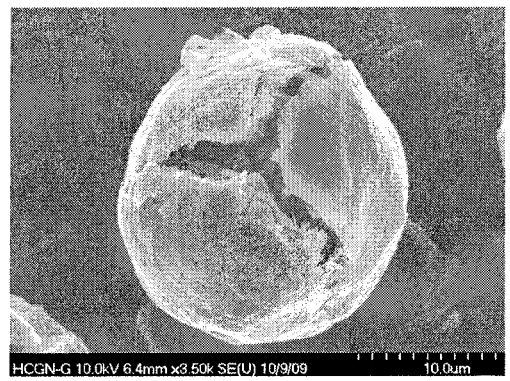
FIG. 5 shows an enlarged SEM image at 3.5× magnification of a negative active material prepared according to Comparative Example 1.

FIGS. 4 and 5 show SEM images of the negative active material. Referring to FIGS. 4 and 5, unlike those shown in the images of FIGS. 2 and 3, the negative active material has a smooth surface.

Comparative Example 2

A negative active material was prepared in the same manner as in Example 1, except that instead of the carbonaceous core prepared according to Preparation Example 1, the carbonaceous core prepared according to Comparative Preparation Example 2 was used.

Comparative Example 3

A negative active material was prepared in the same manner as in Example 1, except that instead of the carbonaceous core prepared according to Preparation Example 1, the carbonaceous core prepared according to Comparative Preparation Example 3 was used.

Comparative Example 4

A negative active material was prepared in the same manner as in Example 1, except that instead of the carbonaceous core prepared according to Preparation Example 1, the carbonaceous core prepared according to Comparative Preparation Example 4 was used.

Manufacture of Lithium Battery

Example 3

The negative active material prepared according to Example 1 as a negative active material was mixed with polyvinylidene fluoride as a binder at a weight ratio of 94:6 in an N-methylpyrrolidone solvent, thereby preparing a negative electrode slurry. The negative electrode slurry was coated to a thickness of 90 μm on a lithium (Li) foil, thereby forming a thin electrode plate, and then, the thin electrode plate was dried at a temperature of 135° C. for 3 hours or more, and then pressed to reduce the thickness of the thin electrode plate to 70 μm. The resultant electrode plate was punched to form a 13ϕ-sized circular shape and then a weight of the plate was recorded. Then, an electrode was formed to be appropriate for welding and then a weight thereof was recorded. The result was welded on a lower portion of a 2032 coin cell and then, exhausting was performed thereon in a vacuum oven at a temperature of 250° C. for 5 hours. Then, a lithium electrode (positive electrode), a polyethylene separator (Star 20) that had a thickness of 20 μm, and an electrolytic solution including 1.15M $LiPF_6$ and a mixture including ethylene carbonate (EC), ethylmethyl carbonate (EMC) and diethyl carbonate (DEC) (volumetric ratio of EM:EMC:DEC was 3:3:4) were assembled to manufacture a battery (assembly density: 1.3 g/cc, thickness: 40 nm, L/L:4).

Example 4

A lithium battery was manufactured in the same manner as in Example 3, except that instead of the negative active material prepared according to Example 1, the negative active material prepared according to Example 2 was used.

Comparative Example 5

A lithium battery was manufactured in the same manner as in Example 3, except that instead of the negative active material prepared according to Example 1, the negative active material prepared according to Comparative Example 1 was used.

Comparative Example 6

A lithium battery was manufactured in the same manner as in Example 3, except that instead of the negative active material prepared according to Example 1, the negative active material prepared according to Comparative Example 2 was used.

Comparative Example 7

A lithium battery was manufactured in the same manner as in Example 3, except that instead of the negative active material prepared according to Example 1, the negative active material prepared according to Comparative Example 3 was used.

Evaluation Example

Evaluation Example 1

Crystallinity Test (XRD Experiment)

Figure 8B:
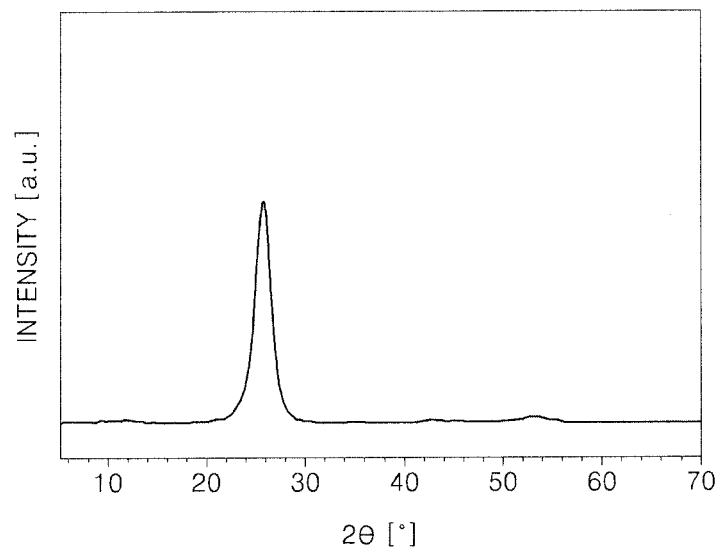
FIG. 8B shows X-ray diffraction analysis results of a carbonaceous core prepared according to Comparative Preparation Example 4.

A XRD test was performed on each of the carbonaceous cores prepared according to Preparation Examples 1 and 2 and Comparative Preparation Examples 2 and 4, and results thereof are shown in FIG. 8A, 8B, and Table 1. The test was performed using a CuK-alpha characteristic X-ray wavelength of 1.541 Å.

A peak with respect to a surface (002) of each of the carbonaceous cores prepared according to Preparation Examples 1 and 2 and Comparative Preparation Examples 2 and 4 was identified, Bragg angle 2θ of and a full width at half maximum measured from the peak, and an interlayer spacing ($d_{002}$) and a crystallite size measured from the full width at half maximum are shown in Table 1.

TABLE 1

| | Bragg angle 2θ (°) | Surface interval (Å) | Full width at half maximum(°) | Crystallite size (nm) |
|---|---|---|---|---|
| Preparation Example 1 | 26.45 | 3.365 | 0.4 | 26.5 |
| Preparation Example 2 | 26.40 | 3.365 | 0.45 | 26.1 |
| Comparative Preparation Example 2 | 26.60 | 3.345 | 0.145 | 59.5 |
| Comparative Preparation Comparative Example 4 | 13 | 6.9 | 0.43 | 18.1 |

Referring to the X-ray diffraction analysis results, the carbonaceous cores prepared according to Preparation Examples 1 and 2 have similar crystallinity to each other, and the crystallinity of the carbonaceous cores prepared according to Preparation Examples 1 and 2 is distinguished from the crystallinity of the carbonaceous cores prepared according to Comparative Preparation Examples 2 and 4.

Evaluation Example 2

Residual Sulfur Content Evaluation

A sulfur content of each of the negative active materials prepared according to Example 1 and Comparative Examples 1 to 3 was measured by using an inductively coupled plasma mass spectrometry (ELAN DRC-e, Perkin Elmer product). Results thereof are shown in Table 2 below.

TABLE 2

|  | Residual sulfur content (ppm) |
|---|---|
| Example 1 | 607 |
| Comparative Example 1 | 1563 |
| Comparative Example 2 | 200 |
| Comparative Example 3 | 1500 |

Referring to Table 2, it was confirmed that the sulfur content of the negative active material prepared according to Example 1 is greater than those of the negative active materials prepared according to Comparative Examples 1 and 3.

Evaluation Example 3

Ring Lifetime Characteristics Evaluation

Figure 10:
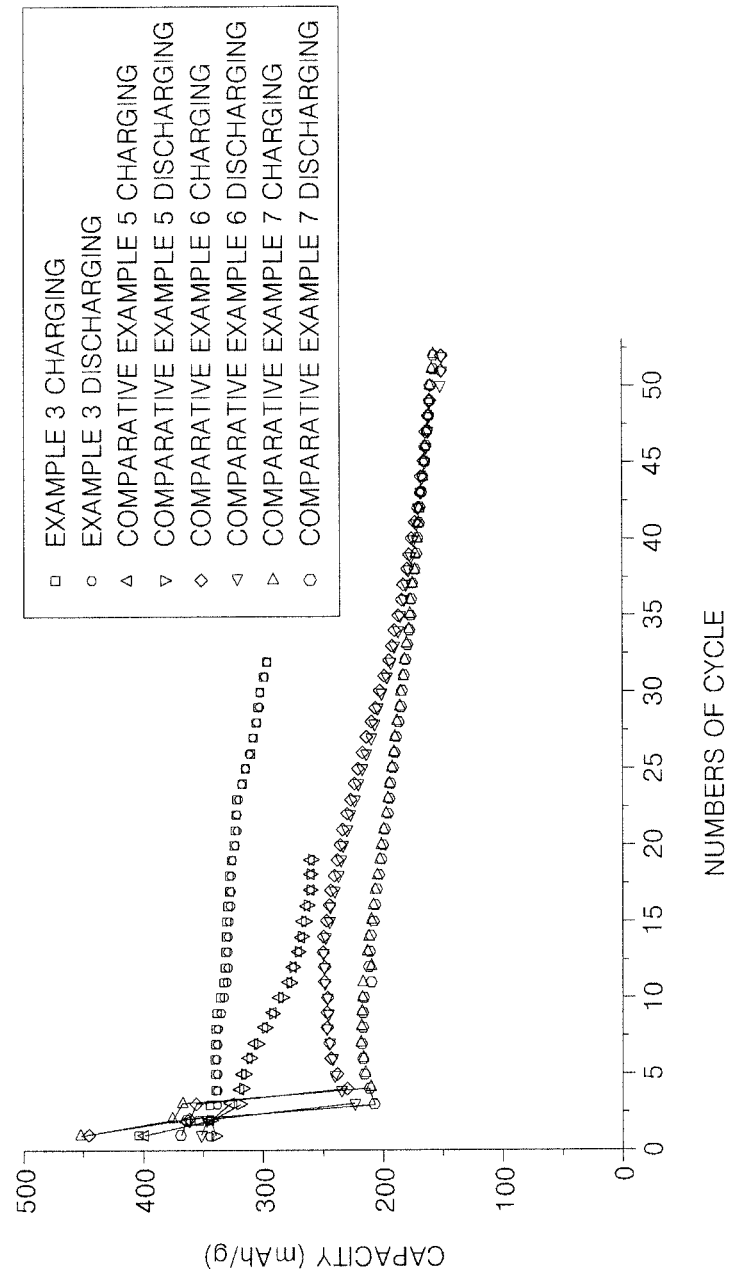
FIG. 10 shows a graph showing capacity characteristics of lithium batteries prepared according to Example 3 and Comparative Examples 5 to 7.

4C/4C ring lifetime characteristics of the lithium batteries manufactured according to Example 3 and Comparative Examples 5 to 7 may be understood by referring to FIG. 10 (The ring lifetime of FIG. 10 was evaluated when an assembly density of the lithium batteries manufactured according to Example 3 and Comparative Examples 5 to 7 was 1.3 g/cc.)

Referring to FIG. 10, it was confirmed that the lithium battery manufactured according to Example 3 had excellent ring lifetime.

Also, regarding the lithium batteries manufactured according to Example 3 and Comparative Example 5 to 7, a capacity retention rate was measured while charging and discharging with a constant current of 1C rate in a voltage range of 2.5 to 4.1 V with respect to lithium metal at room temperature, and results thereof are shown in Table 3 below. The capacity retention rate at room temperature is calculated via Equation 1:

Capacity retention rate[%]=[discharge capacity in a $50^{th}$ ring at 4C/discharge capacity in a $1^{st}$ ring at 4C]×100        <Equation 1>

TABLE 3

|  | Average discharge capacity | Capacity retention rate (%) |
|---|---|---|
| Example 3 | 340 mAh/g | 85% |
| Comparative Example 5 | 340 mAh/g | 60% |
| Comparative Example 6 | 340 mAh/g | 85% |
| Comparative Example 7 | 350 mAh/g | 80% |

Referring to Table 3, the lithium battery manufactured according to Example 3 has better lifetime characteristics of the batteries manufactured according to Comparative Examples 5 and 7.

As described above, according to the one or more of the above embodiments, a negative active material includes a core that has relatively small sulfur content and an amorphous carbon layer continuously disposed on a surface of the core. Due to the inclusion of the carbonaceous material, lithium ions are easily intercalated and deintercalated. Accordingly, a lithium battery including the negative active material has improved capacity characteristics and ring lifetime characteristics.

It should be understood that the example embodiments described therein should be considered in a descriptive sense only and not for purposes of limitation. Descriptions of features or aspects within each embodiment should typically be considered as available for other similar features or aspects in other embodiments.

What is claimed is:

1. A negative active material comprising:
    a carbonaceous core comprising a sulfur content of from about 10 ppm to 900 ppm; and
    an amorphous carbon layer continuously formed on a surface of the carbonaceous core,
    wherein the carbonaceous core has a crystalloid plate structure, and a crystallite size measured from a full width at half maximum of the peak with respect to the surface (002) of from about 10 nm to about 45 nm in an X-ray diffraction spectrum of the carbonaceous core.

2. The negative active material of claim 1, wherein the carbonaceous core has a peak with respect to a surface (002) at a Bragg angle 2θ of 26.4°±0.1° in the X-ray diffraction spectrum of the carbonaceous core.

3. The negative active material of claim 1, wherein the carbonaceous core has a full width at half maximum of the peak with respect to the surface (002) of from about 0.2° to about 0.6 in the X-ray diffraction spectrum of the carbonaceous core.

4. The negative active material of claim 1, wherein the carbonaceous core has an interlayer spacing ($d_{002}$) of the surface (002) measured by X-ray diffraction of about 3.36 Å to about 3.37 Å.

5. The negative active material of claim 1, wherein the amorphous carbon layer is a pitch coating.

6. The negative active material of claim 1, wherein the negative active material is spherical or oval, and a longer direction particle size thereof $d_{50}$ is from about 1 μm to about 40 μm.

7. The negative active material of claim 1, wherein the negative active material has voids therein.

8. The negative active material of claim 1, wherein a BET specific surface area of the negative active material is from about 1 m²/g to about 30 m²/g.

9. The negative active material of claim 1, wherein a tap density of the negative active material is from about 0.2 g/cc to 2.0 g/cc.

10. The negative active material of claim 1, wherein the negative active material additionally comprises metal nanoparticles.

11. The negative active material of claim 10, wherein the metal nanoparticles is selected from the group consisting of silicon (Si), tin (Sn), nickel (Ni), and a mixture thereof.

12. The negative active material of claim 10, wherein a size of the metal nanoparticles is from about 1 nm to about 500 nm.

13. A lithium battery comprising:
    a positive electrode comprising a positive active material;
    a negative electrode comprising a negative active material comprising:

a carbonaceous core comprising a sulfur content of from about 10 ppm to 900 ppm; and an amorphous carbon layer continuously formed on a surface of the carbonaceous core, wherein the carbonaceous core has a crystalloid plate structure, and a crystallite size measured from a full width at half maximum of the peak with respect to the surface (002) of from about 10 nm to about 45 nm in an X-ray diffraction spectrum of the carbonaceous core; and an electrolytic solution interposed between the positive and negative electrodes.

* * * * *